US006470372B1

(12) United States Patent
Monier (10) Patent No.: US 6,470,372 B1
(45) Date of Patent: Oct. 22, 2002

(54) METHOD FOR THE PERFORMANCE OF AN INTEGER DIVISION

(75) Inventor: Guy Monier, Rognac (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/282,370

(22) Filed: Mar. 31, 1999

(30) Foreign Application Priority Data

Apr. 2, 1998 (FR) ............................... 98 04273

(51) Int. Cl.[7] .............................. G06F 7/52; G06F 7/00
(52) U.S. Cl. ...................................... 708/650; 708/491
(58) Field of Search ................... 708/491, 492, 708/650, 651, 652, 653, 655, 656; 380/28, 30

(56) References Cited

U.S. PATENT DOCUMENTS

| | | | |
|---|---|---|---|
| 5,261,001 A | * 11/1993 | Dariel et al. | 380/30 |
| 5,987,489 A | * 11/1999 | Monier | 708/523 |
| 6,163,790 A | * 12/2000 | Monier | 708/491 |

FOREIGN PATENT DOCUMENTS

WO      97/25668      7/1997

OTHER PUBLICATIONS

D. Knuth, "The Art of Computer Programming," vol. 2, Seminumerical Algorithms, 2nd Edition, 1981, pp. 250–265.

* cited by examiner

Primary Examiner—Chuong Dinh Ngo
(74) Attorney, Agent, or Firm—Lisa K. Jorgenson; Allen, Dyer, Doppelt, Milbrath & Gilchrist, P.A.

(57) ABSTRACT

A method for performing in a modular arithmetic coprocessor an integer division of a first binary data element by a second binary data element. The result is obtained by making an iterative loop of operations including an integer division of the first data element by a most significant word of the second data element. A test is performed to determine if the result of the division performed corresponds to a word of the final result sought. The first data element is modified by subtracting from it a data element produced by multiplying the second data element by the word of the final result sought that has been previously produced.

3 Claims, 5 Drawing Sheets

FIG_1 PRIOR ART

FIG_2 PRIOR ART

FIG_3  PRIOR ART

FIG_4

METHOD FOR THE PERFORMANCE OF AN INTEGER DIVISION

FIELD OF THE INVENTION

The invention relates to the field of microprocesors, and, more particularly, to a modular arithmetic coprocessor that performs an integer division.

BACKGROUND OF THE INVENTION

As described in international Patent Application PCT/FR 97/00035, there already exist known modular arithmetic coprocessors implementing modular exponential operations. This type of operation enables encryption and decryption of binary messages encoded in an RSA type encoding. This type of coprocessor, described, for example, in European Patent Application No. 601,907 can not be used to perform integer divisions. However, the use of an RSA encoding requires the performance of such division operations. It therefore becomes necessary to use a processor to perform these divisions. This involves penalties in terms of computation duration and requires the use of a large-sized program and data memory.

The above referenced international patent application modifies the coprocessor disclosed in the European patent application to perform integer divisions without using a processor. Nonetheless, there is still a need to reduce computation times in performing an integer division.

SUMMARY OF THE INVENTION

A method for performing an integer division in a coprocessor divides a first data element M by a second data element D. The first data element M is binary encoded on m words $M(m-1) \ldots M(1), M(0)$ of L bits. The second data element D is binary encoded on d words $D(d-1) \ldots D(1), D(0)$ of L bits. The variables m, L and d are integers and d<m. The result referenced as Q is encoded on q words $Q(q-1), Q(q-2) \ldots Q(1), Q(0)$ of L bits with q=m−d+1 and $Q(q-1)=00 \ldots 00$ or $00 \ldots 01$.

The method includes the steps of taking the complement of the data element M by a most significant word bit M(m) formed by L zeros, and performing a computational iterative loop m−d+1 times. The computational iterative loop includes the steps of producing a first intermediate data element $Q(q-1-j)$, with j as an index varying from 0 to q−1 and binary encoded on L bits for performing an integer division of the two most significant words of the first data element M by the most significant word of the second data element D a second intermediate data element Z(m−j)binary encoded on 2 *L bits is produced to test and determine whether the first intermediate data element $Q(q-1-j)$ is greater than a desired value of one of the words of the result Q, or whether it corresponds to a desired value of one of the following words.

In the former case, the first intermediate data element is decremented by one unit and the previous step is repeated. In the second case, the multiplication of the second data element D by the first intermediate data element $Q(q-1-j)$ is performed to form a third intermediate data element B binary encoded on d+1 words of L bits. The d new most significant words $M(m-j-1) \ldots M(m-j-d)$ of the first data element are generated for performing a subtraction of the third intermediate data element B from the d+1 non-zero most significant bits of the first data element, except during the first iteration where the word M(m) and the d most significant words of the first data element M are considered. If the result of the subtraction is negative, the first intermediate data element is decremented by one unit and the d new most significant words are modified by adding the second data element to these words.

According to one embodiment, the method preferably includes the following steps E1–E6. Step E1 includes the steps of loading the word M(m−1) into a first register; the most significant bit of this word being provided as an output of the first register; loading of L zeros corresponding to a word M(m) in a second register; loading L zeros into a third register; loading the word D(d−1) into a fourth register; and the least significant bit of this word is provided at an output of the fourth register.

The repetition q times of the following steps E2–E6 are performed, where j is an index varying from 0 to q−1. Step E2 is the integer division of the contents of the second and first registers by the contents of the fourth register; and the storage of the L least significant bits of the result, referenced $Q(q-1-j)$, in the first register and in the fifth and sixth registers.

Step E3 includes the steps of loading the word D(d−2) into the second register; the least significant bit of this word is provided at an output of the second register; loading the words M(m−1−j) and M(m−j) in series in the third register; the least significant bits being directed towards the output of this third register; loading of the word M(m−2−j) into a seventh register, and the least significant bit of this word being directed towards the output of the seventh register.

Step E4 includes the steps of shifting the contents of the second and fourth registers towards series inputs of a first multiplication circuit and a second multiplication circuit, and the contents of the third and seventh registers, with looping of the outputs of these registers to their inputs; multiplying D(d−2) by $Q(q-1-j)$ in the first multiplication circuit; multiplying D(d−1) by $Q(q-1-j)$ in the second multiplication circuit; subtracting M(m−j)M(m−j−1) from $D(d-1)*Q(q-1-j)$ in a first subtraction circuit; subtracting M(m−2−j) from the data element produced by the first subtraction circuit in a second subtraction circuit; the word M(m−2−j) is delayed in a delay cell; subtracting the data element produced by the second subtraction circuit from $D(d-2)*Q(q-1-j)$ in a third subtraction circuit; and testing the result of the last subtraction in a test circuit.

Step E5 includes the steps of determining that if the result of the last subtraction of the step E4 is positive, then the contents of the first register are shifted; subtracting an L bit data element formed by a least significant bit at one and of L−1 most significant bit at zero from the data element $Q(q-1-j)$ initially present in the first register; subtracting being done in a fourth subtraction circuit, and storing the data element produced by the fourth subtraction circuit in the first register; and step E4 is repeated.

Step E6 includes the steps of determining the result of the last subtraction of step E4 is negative, then the words $M(m-j) \ldots M(m-d-j)$ are loaded in the third register and the data element D is loaded in the fourth register; shifting the contents of the third and fourth registers with the looping of the output of the fourth register to its input so as to keep D(d−1) in this register; multiplying the data element D by the data element $Q(q-1-j)$ in the second multiplication circuit; subtracting the result produced by the second multiplication circuit from the bits given by the third register in the first subtraction circuit, and the testing of the result.

Step E6 further includes the steps of determining that if the result given by the first subtraction circuit is negative, then the data element D given by the fourth register is added to the result produced by the first subtraction circuit in an addition circuit; subtracting an L bit data element formed by a least significant bit at one and by L−1 most significant bits at zero from the data element Q(q−1−j) initially present in the first register, the subtraction being done in the fourth subtraction circuit; and storing the data element produced by the fourth subtraction circuit in the first register; storing the last two words of the result produced by the first subtraction circuit or, as the case may be, by the addition circuit, referenced M(m−1−j) . . . M(m−d−j), in the second and first registers, the data elements Q(q−1−j) and M(m−3−j) . . . M(m−d−j) being output external the coprocessor for storage and the data elements M(m−3−j) . . . M(m−d−j) replacing the data elements M(m−3−j) . . . M(m−d−j) having corresponding place values in the data element M, the least significant bits of the words M(m−1−j) and M(m−2−j) being directed towards the outputs of the second and fourth registers; and loading L zeros into the third register.

According to one embodiment, the steps E1, E3 and E6 are modified as follows. Step E1 now includes the steps of loading the data element M and L zeros in a third register; loading the word M(m−1) in a first register, the most significant bit of this word provided an output of this first register; loading L zeros corresponding to a word M(m) in a second register; loading the data element D in a fourth register, the least significant bit of the word D(D−1) provided at an output of this fourth register.

Step E3 now includes the steps of loading the word D(d−2) into the second register, the least significant bit of this word provided at an output of the second register; loading the word M(m−2−j) into a seventh register, the least significant bit of this word being directed towards the output of this register.

Step E6 now includes the steps of determining that if the result of the last subtraction of the step E4 is negative, then the contents of the third and fourth registers are shifted; multiplying the data element D by the data element Q(q−1−j) in the second multiplication circuit; subtracting the result produced by the second multiplication circuit from the bits given by the third register into the first subtraction register.

Step E6 further includes the steps of determining that if the result produced by the first subtraction circuit is negative, then the data element D, given by the fourth register, is added to the result produced by the first subtraction circuit in the addition circuit; and subtracting a data element of L bits formed by one least significant bit at one and by L−1 most significant bits at zero from the data element Q(q−1−j) initially present in the first register, the subtraction being done in the fourth subtraction register; and storing the result of this last subtraction in the first register; storing the last two words of the result produced by the first subtraction circuit, or as the case may be, by the addition circuit, referenced M(m−1−j) . . . M(m−d−j), in the third, second and first registers; storing the data elements M(m−3−j) . . . M(m−d−j) in the third register and replacing the data elements M(m−3−j) . . . M(m−d−j) having corresponding place values in the data element M, the least significant bits of the words M(m−1−j) and M(m−2−j) being directed towards the outputs of the second and first registers; and loading L zeros into the third register.

According to one embodiment, the step E2 comprises the following sub-steps. Step E21 includes the steps of resetting the test circuit, the third subtraction circuit and a fifth subtraction circuit.

Step E22 includes the steps of shifting by one bit the third and fourth registers, the third register recovering the most significant bit of the second register as a most significant bit, the fourth register having its output connected to its input; subtracting in the third subtraction circuit between the most significant bit of the second register and the least significant bit of the fourth register, the fifth subtraction circuit carrying out a subtraction between the least significant bit of the third register and zero.

Step E23 includes the steps of shifting by 2*L−1 bits the third and fourth registers, the output of the fourth register being connected to its input, the input of the third register being connected to the output of the fifth subtraction circuit; subtracting between the 2*L−1 bits output from the third register and zero in the fifth subtraction circuit; and subtracting between the result output from the fifth subtraction circuit and the bits of the fourth register.

Step E24 includes the steps of storing the last carry value of the third subtraction circuit in the test circuit and providing at the output of this test circuit a binary data element equal to the complement of the stored carry value.

Step E25 includes the steps of shifting by one bit the first and second registers, the most significant bit of the first register being loaded as the least significant bit of the second register; and loading the binary data element stored in the test circuit as a least significant bit in the first register.

Step E26 includes the steps of resetting the third and fifth subtraction circuits. Step E27 includes the steps of repeating 2*L−1 times the steps E2 to E6, the fifth subtraction circuit performing a subtraction between the contents of the third register and zero if the previously stored carry value is equal to one; or the fifth subtraction circuit performs a subtraction between the contents of the third register and the contents of the fourth register if the previously stored carry value is equal to zero.

BRIEF DESCRIPTION OF THE DRAWINGS

Other advantages and particular features shall appear from the following description of an exemplary embodiment of the invention provided along with the appended drawings, of which.

DETAILED DESCRIPTION OF THE PREFERRED EMBODIMENTS

Figure 1:
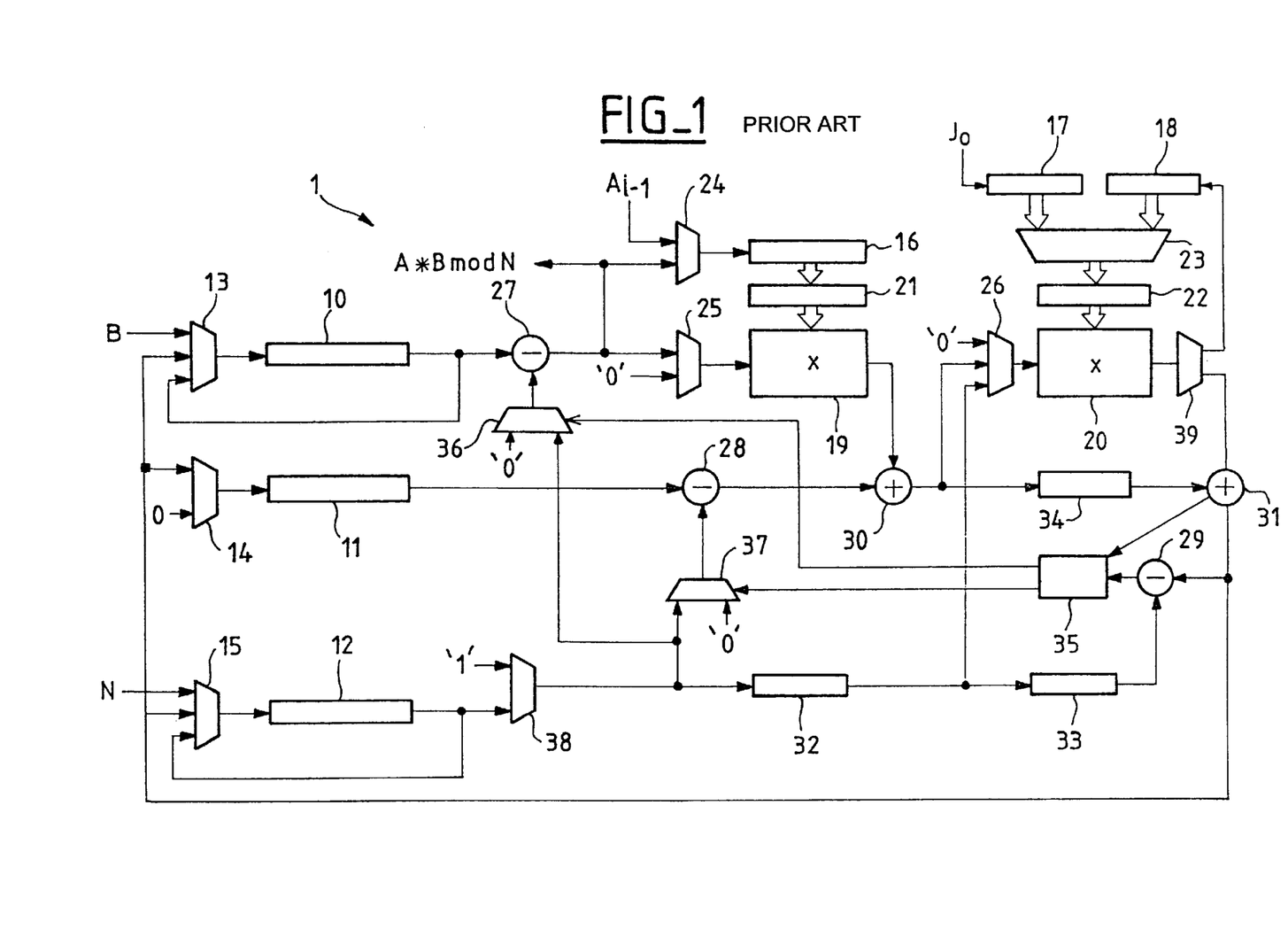
FIG. 1 shows a modular arithmetic coprocessor according to the prior art.

FIG. 1 shows a prior art modular arithmetic coprocessor. This figure corresponds to FIG. 1 of the international Patent Application PCT/FR 97/00035 described therein on page 6, line 1 to page 7, line 7. The entire patent application of which is herein incorporated by reference.

Figure 2:
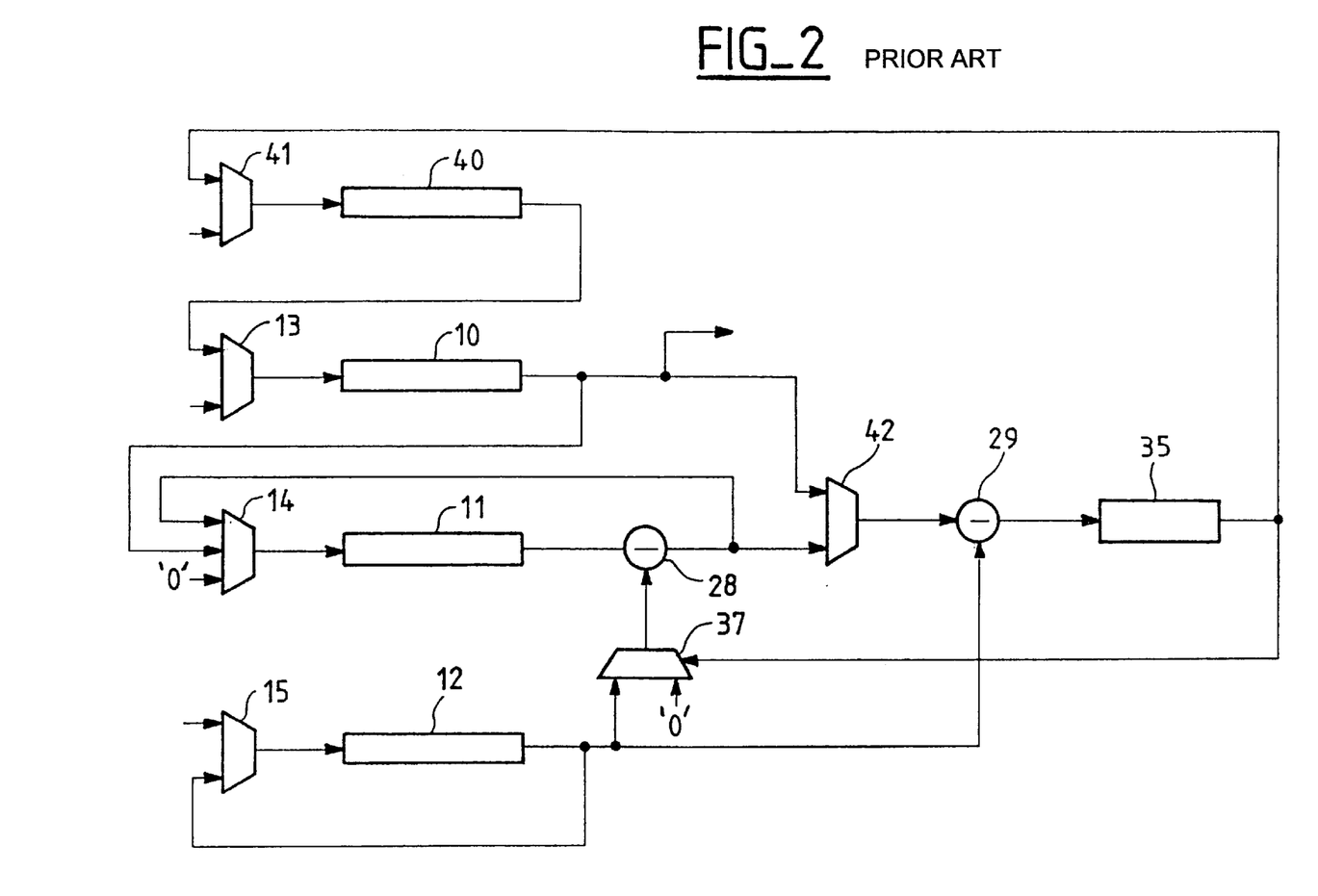
FIG. 2 shows a division circuit according to the prior art.

FIG. 2 is a prior art schematic view of a division circuit formed with elements of the coprocessor illustrated in FIG. 1. This FIG. 2 corresponds to FIG. 2 of the above referenced patent application, as described on page 7, line 8 to page 9, line 13 therein.

Figure 3:
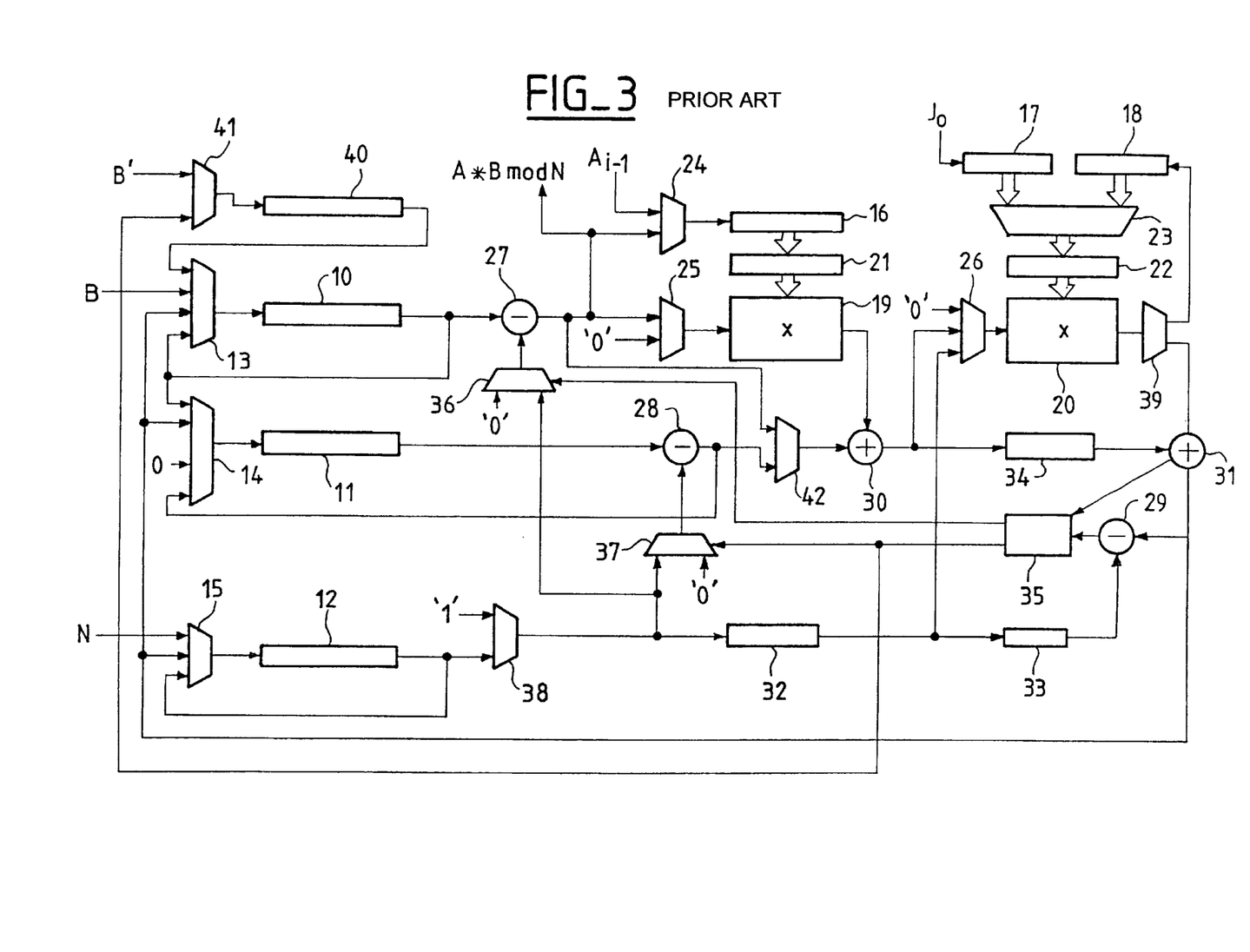
FIG. 3 shows a modular arithmetic coprocessor modified to form a division circuit according to the prior art.

FIG. 3 is a prior art schematic view of the coprocessor of FIG. 1 supplemented with elements for enabling implementation of an integer division. This FIG. 3 corresponds to FIG. 3 of the referenced patent application as described on page 13, line 24 to page 15, line 9 therein. Primarily, the circuit shown in FIG. 3 includes, in addition to the elements of the circuit of FIG. 1, a register 40 and additional multiplexers 41 and 42.

The referenced patent application describes a method for the computation of integer divisions using the circuit of FIG. 2. This method is described on page 9, line 14 to page 11, line 5 therein. It is desired to carry out an integer division of a number M encoded on m bits, with m as an integer, by a number D encoded on d bits. The result Q is encoded on q=m−d+1 bits.

The method for implementing the above algorithm, with d=n, where n is an integer and m=2*n and q=n, is described as follows:

Step 1 includes the steps of loading the data element M into the n bit registers 40 and 10, the register 40 containing the n least significant bits of M and the register 10 containing the n most significant bits of M, each of these registers 40 and 10 having its most significant bit towards its output and its least significant bit towards its input.

Step 1 further includes resetting the n bit register 11 with zeros; loading into the n bit register 12 of the number D, the least significant bit being towards the output and the most significant bit being towards the input; resetting the test circuit 35 to make the connection of the second input of the subtraction circuit 28 with a logic zero; and the zero setting of the subtraction circuits 28 and 29.

Step 2 includes the steps of shifting by one bit the registers 11 and 12, the register 11 recovering the most significant bit of the register 10 as a most significant bit, the register 12 having its output connected to its input; subtracting in the subtraction circuit 29 between the most significant bit of the register 10 and the least significant bit of the register 12; and subtracting in the subtraction circuit 28 between the last significant bit of the register 11 and zero.

Step 3 includes the steps of shifting by (n−1) bits of the registers 11 and 12, the output of the register 12 being connected to its input and the input of the register 11 being connected to the output of the subtraction circuit 28; subtracting between the (n−1) bits output from the register 11 and zero in the subtraction circuit 28; subtracting in the subtraction circuit 29 between the resultant bits output from the subtraction circuit 28 and the bits output from the register 12.

Step 4 includes the steps of storing a binary data element equal to the complement of the last carry value of the subtraction circuit 29 in the test circuit 35 and producing at the output of this test circuit 35 the binary data element.

Step 5 includes the steps of shifting by one bit of the registers 40 and 10, the most significant bit of the register 40 is loaded as a least significant bit of the register 10; the binary data element stored in the test circuit 35 is loaded as a least significant bits in the register 40.

Step 6 includes the steps of resetting the subtraction circuits 28 and 29. Step 7 includes the steps of repeating (2*n−1) times the steps 2 to 6; and using the subtraction circuit 28 to perform a subtraction between the contents of the register and zero if the binary data element stored is equal to zero, or between the contents of the register 12 if this data element is equal to one.

The result Q is stored in the registers 40 and 10. It is possible then to extract by a 2*n bit shift the contents of the registers 40 and 10. The output of the register 40 is connected to the input of the register 10. The most significant bit of the result is output first. The remainder of the division is present in the register 11.

The method implemented is capable of several modifications, described on page 11, line 6 to page 13, line 23 of the above referenced patent application. The method enables the performance of the division in $2n^2+9n$ clock cycles as indicated on page 12, line 29 of the referenced application.

The method described above is modified to reduce the computation time. To do so, a different type of operation is performed, wherein the subsets of bits of the result Q are computed. Thus, the operation of searching for the bits of the result Q by a bit-by-bit division is eliminated since this search induces a computation time proportional to $n^2$ as indicated here above.

In the disclosed method, the result Q will be produced in packets of L bits with L as an integer greater than 1. More specifically, in a first stage, an estimation is made of the packets of L bits of the result Q. This estimation is readjusted if necessary. Then the divider is multiplied by the packets of L bits of the result, and a comparison and a subtraction are performed.

It will be assumed that the operands M and D are encoded on m*L and d*L bits with m, d and L being integers. As the case may be, the data elements M and D may be complemented with logic zeros to meet this condition. A result Q encoded on (m−d)*L+1 bits is obtained.

Let:

$M=M_{mL-1} M_{mL-2} \ldots M_1 M_0 = M(m-1) M(m-2) \ldots M(1) M(0)$, with $M(0), \ldots, M(m-1)$ being L bit sub-data elements, $D=D_{dL-1} D_{dL-2} \ldots D_1 D_0 = D(d-1) D(d-2) \ldots D(1) D(0)$, with $D(0), \ldots, D(d-1)$ being L bit sub-data elements, and $Q=M/D=Q(m-d)L \ldots Q_1 Q_0 = Q(q-1) Q(q-2) \ldots Q(1) Q(0)$, with $Q(0), \ldots, Q(q-1)$ being L bit sub-data elements, q=m+d+1 and Q(q−1)=00 . . . 00 or 00 . . . 01.

To compute the result Q, the following algorithm is implemented:

M'(m)=M(m), M(m) is formed by L zeros,

For j varying from 0 to (q−1):

Step 1: $X(m-j)=M'(m-j)*2^L+M(m-j-1)$, with X(j) encoded on 2*L bits.

Step 2: Q(q−1−j)=X(m−j)/D(d−1), with Q(q−1−j) encoded on L bits.

Step 3: Z(m−j)=[Q(q−1−j)*D(d−2)] ([X(m−j)−Q(q−1−j)*D(d−1)+M(m−2−j)], Z(m−j) encoded on 2*L bits.

If Z(m−j)>0 then Q(q−1−j)=Q(q−1−j)−00 . . . 01 and further computation of Z(m−j) is performed, else:

M(m−j−1) . . . M(m−j−d)=A−B, with A and B being encoded on (d+1)*L bits, herein

A=M'(m−j) M(m−j−1) . . . M(m−j−d), and

B=Q(q−1−j)*D.

If A−B<0 then Q(q−1−j)=Q(q−1−j)−00 . . . 01, M(m−j−1) . . . M(m−j−d)=M(m−j−1) . . . M(m−j−d)+D, and j=j+1.

According to the invention, the result of the integer division is performed by obtaining the complement of the first data element M by a most significant word M(m) formed by L zeros, and carrying out m−d+1 times a computation iterative loop indexed by j, with j varying from 0 to (q−1). The computation iterative loop includes producing a first intermediate data element Q(q−1−j) with j as an index varying from 0 to q−1, and being encoded in binary mode on L bits in implementing the integer division of the two most significant words of the first data element by the most significant word of the second data element D. The loop further includes producing a second intermediate data element Z(m−j), encoded in binary mode on 2*L bits to test and find out if the first intermediate word Q(q−1−j) is greater than the desired value of the one of the words of the result Q, or if it corresponds to a desired value of one of these words.

In the former case, decrementing by one unit of the first intermediate data element Q(q−1−j) and the repetition of the previous step is performed. In the latter case, the implementation of the multiplication of the second data element D by the first intermediate data element Q(q−1−j) to form a third intermediate data element B encoded in binary mode on d+1 L bit words is performed. The production of d new most significant words M(m−j−1) . . . M(m−j−d) of the first data element in implementing a subtraction of the third intermediate data element B from the d+1 non-zero most significant words of the first data element is performed, except during the first iteration where the word M(m) and the d most significant words of the first data element M are considered.

If the result of the last subtraction is negative, then decrementing by one unit of the first intermediate data element Q(q−1−j) and the modification of the d new most significant words produced M(m−j−1) . . . M(m−j−d) by the addition of the second data element D to these d words are produced. To implement the method described above, the circuit illustrated in FIG. 4 is used, assuming that registers 10, 11, 12 and 40 of variable sizes are available. This enables the storage of binary data elements of different sizes in one register.

Figure 5:
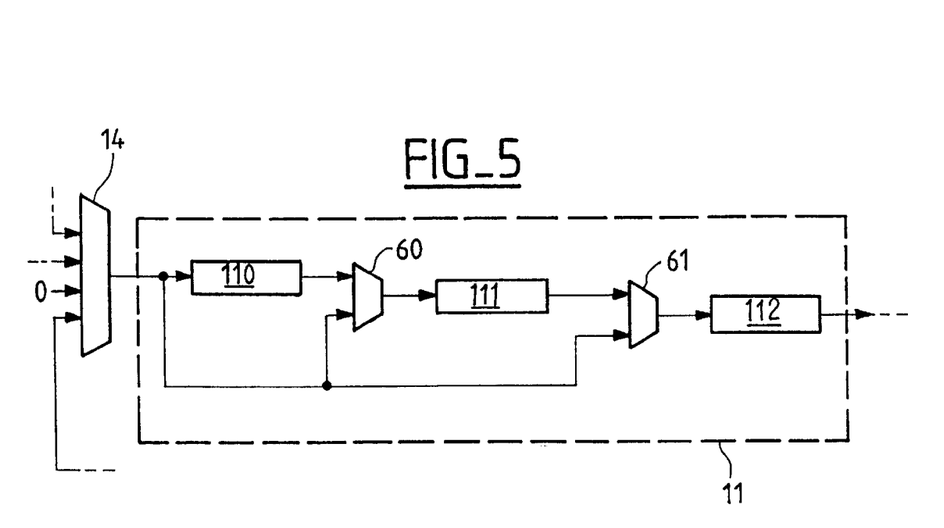
FIG. 5 shows a first exemplary embodiment of a variable-sized register according to the present invention.

FIG. 5 shows a first exemplary embodiment of a variable sized register. By way of an example, we shall consider the register 11. According to the embodiment of FIG. 5, the register 11 is formed by series-connected sub-registers 110, 111 and 112. The output of the multiplexer 14 is connected to the input of the sub-register 110 and to first inputs of the multiplexers 60 and 61. These multiplexers 60 and 61 have second inputs, respectively connected to the outputs of the sub-registers 110 and 111, and outputs connected respectively to the inputs of the sub-registers 111 and 112. Thus, the size of the register 11 could vary depending on the selection command of the multiplexers 60 and 61.

Figure 6:
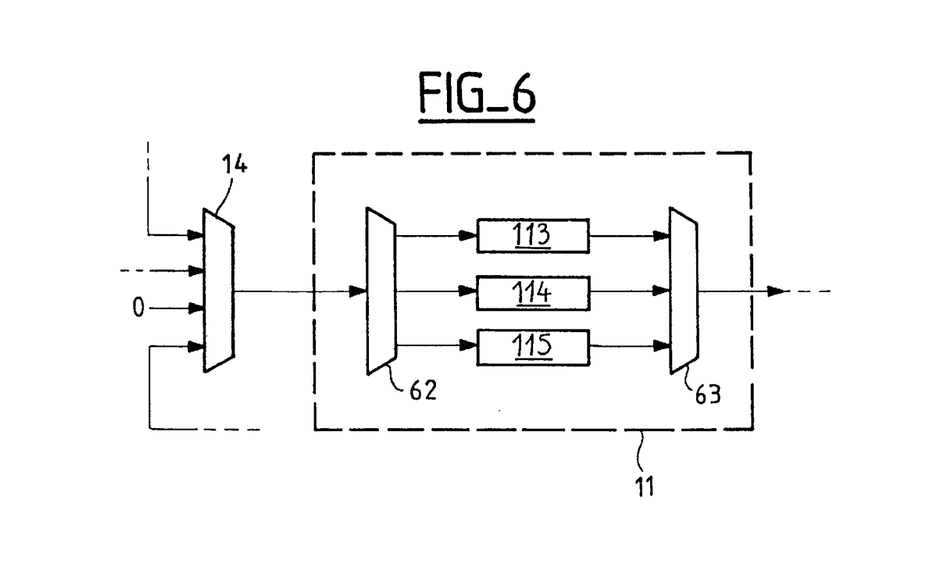
FIG. 6 shows a second exemplary embodiment of a variable-sized register according to the present invention.

FIG. 6 shows a second exemplary embodiment of a variable sized register. For example, the register 11 is considered. According to the embodiment of FIG. 6, the register 11 is formed by sub-registers 113, 115 and 115 that are parallel connected. The output of the multiplexer 14 is connected to the input of a demultiplexer 62. This demultiplexer has three outputs connected to the inputs of the sub-registers. The outputs of the sub-registers are connected to three inputs of the multiplexer 63, one output of which forms the output of the register 11. The size of the register 11 could vary depending on the selection command of the demultiplexer and the multiplexer.

It will be noted that, in the examples described in FIGS. 5 and 6, if a number of sub-registers smaller than the maximum number of sub-registers is used during a computation, the unused sub-registers could be used to store data elements which, for example, may be used in a subsequent computation.

Figure 4:
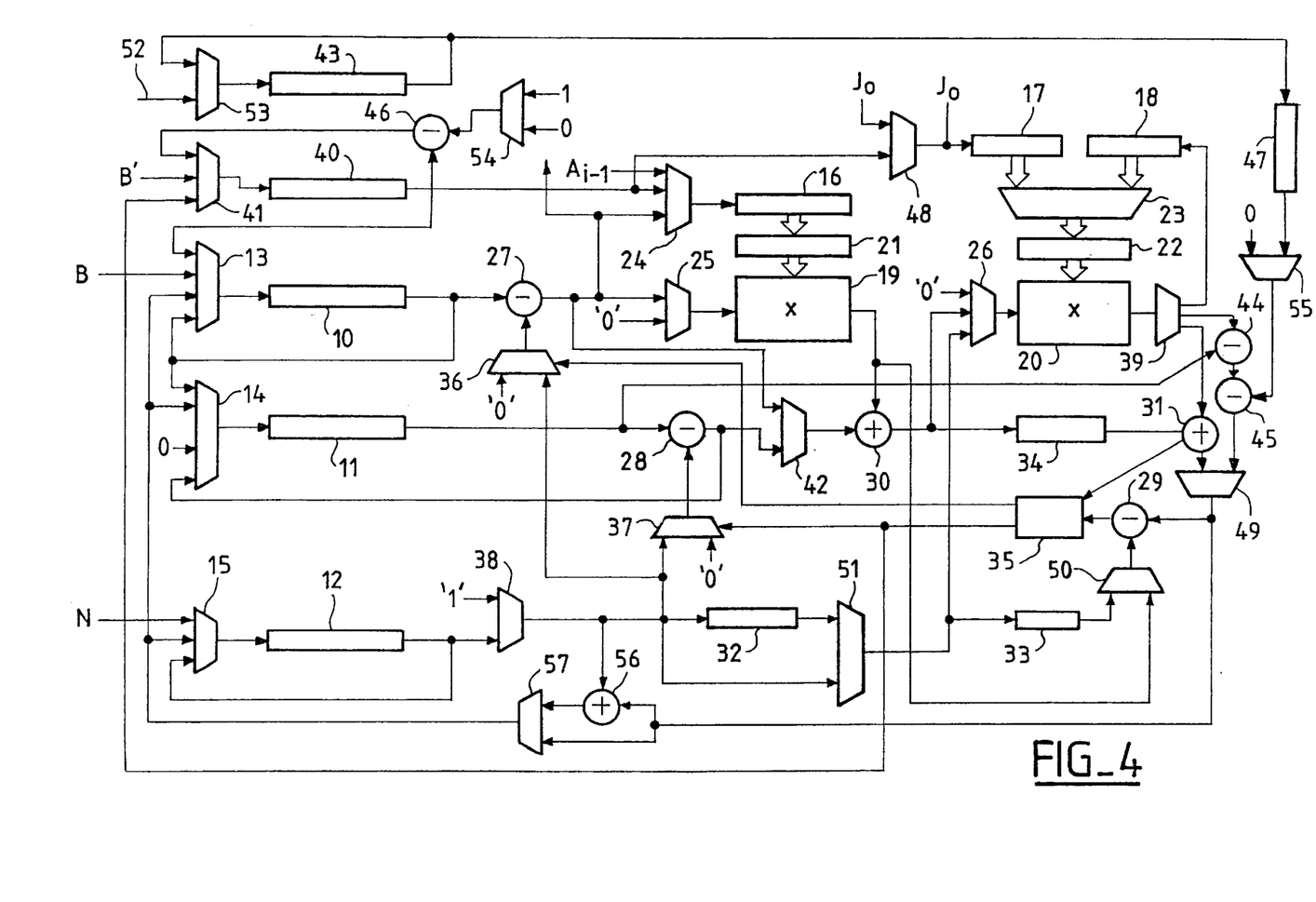
FIG. 4 shows the coprocessor of FIG. 3 modified according to the present invention.

Apart from the different elements of FIG. 3 of the present application, the circuit illustrated in FIG. 4 includes an L bit register 43 with a series input and output, three subtraction circuits 44, 45 and 46 which have two series type inputs and one series type output. The circuit further includes a delay cell 47 with a size L having one series input and one series output, eight multiplexers 48, 49, 50, 51, 53, 54, 55 and 57 which have two inputs and one output, and an addition circuit 56 having two series inputs and one series output.

A first input of the multiplexer 53 is connected to an addition input 52 of the circuit and its output is connected to the input of the register 43. The second input of the multiplexer 53 is connected to the output of the register 43. This enables the input of this register to be connected to its output. The output of the register 43 is connected to the input of the delay cell 47. The multiplexer 24 is modified to include three inputs instead of two. Its third input is connected to the output of the register 40. As a result, it is possible to load bits in the register 16 coming from the register 40.

The output of the register 40 is furthermore connected to one of the inputs of the multiplexer 48. The other input of this multiplexer 48 is connected to an input of the circuit which is capable of receiving a binary data element J0, and its output is connected to the series input of the register 17. It is thus possible to load bits given by the output of the register 40 into the register 17. A first input of the subtraction circuit 44 is connected to the output of the multiplication circuit 20 by a third output of the demultiplexer 39. The second input of the circuit 44 is connected to the output of the register 11.

A first input of the subtraction circuit 45 is connected to the output of the subtraction circuit 44. Its second input is connected to the output of the multiplexer 55. The first input of this multiplexer 55 is connected to the output of the delay cell 47, and its second input receives a logic zero. A first input of the multiplexer 49 is connected to the output of the subtraction circuit 45. Its second input is connected to the output of the addition circuit 31, and its output is connected to the first input of the subtraction circuit 29 and to a first input of the addition circuit 56. The second input of the addition circuit 56 is connected to the output of the multiplexer 38.

It is thus possible to provide the contents of the register 12 to the second input of the addition circuit 56. The output of the addition circuit 56 is connected to a first input of the multiplexer 57. The second input of this multiplexer is connected to the output of the multiplexer 49, and its output is connected to the inputs of the registers 10, 11 and 12 by the multiplexers 13, 14, and 15. It is thus possible to provide the data elements 10, 11 and/or 12 either data elements provided by the multiplexer 49 or data elements obtained by the addition of the contents of the register 12 to the data elements given by the multiplexer 49.

A first input of the multiplexer 50 is connected to the output of the multiplication circuit 19. Its second input is connected to the output of the delay cell 33, and its output is connected to the second input of the subtraction circuit 29. A first input of the multiplexer 51 is connected to the output of the multiplexer 38. Its second input is connected to the output of the delay cell 32, and its output is connected to the multiplexer 26 and to the cell 33, instead of the output of the cell 32 as is the case for the circuits of FIGS. 1 and 3. The multiplexer 51 makes it possible to provide the contents of the register 12 to the series input of the multiplication circuit 20 in preventing these contents from being delayed in the circuit 32. A first input of the subtraction circuit 46 is connected to the output of the register 40. Its second input is connected to the output of the multiplexer 54, which receives a logic 1 and a logic 0 at its inputs. The multiplexer 41 includes a third input connected to the output of the subtraction circuit 46 so that the output of this register can be connected to its input.

It will be noted that the circuit of FIG. 3 can be modified differently to implement the method of the invention. The example given has been provided purely by way of an indication. It will nevertheless be noted that the arrangement of the new elements as described enables the implementation of all the operations that could be carried out previously by the circuit of FIG. 3. For this purpose, it suffices to select the inputs and outputs of the multiplexers and of the demultiplexer in an appropriate manner. This special feature shall not be described in greater detail as it is bound to be seen clearly by those skilled in the art.

An exemplary implementation of the method of the invention includes the following steps E1–E6. Step E1 includes the steps loading the word M(m−1) into the register 40 of the multiplexer 41, the most significant bits of this word provided at an output of this register 40; loading of L zeros corresponding to a word M(m) into the register 10 by the multiplexer 13; loading of L zeros into the register 11 by the multiplexer 14; and loading of the word D(d−1) into the register 12 by the multiplexer 15, the least significant bit of this word providing at an output of this register 12.

The repetition q times of the following steps E2–E6 is performed, with j as an index varying from 0 to q−1. Step E2 includes the steps of performing an integer division of the contents of the registers 10 and 40 by the contents of the register 12; and storing of the L least significant bits of the result, referenced Q(q−1−j), in the registers 40, 16 and 17.

Step E3 includes the steps of transferring of the contents of the registers 16 and 17 respectively into the registers 21 and 22; loading of the word D(d−2) into the register 10 by the multiplexer 13, the least significant bit of this word provided at an output of the register 10; loading of the words M(m−1−j) and M(m−j) in series into the register 11 by the multiplexer 14, the least significant bits being directed towards the output of this register; and loading of the word M(m−2−j) into the register 43, the least significant bit of this word being directed towards the output of the register 43.

Step E4 includes the steps of shifting of the contents of the registers 10 and 12 towards the series inputs of the multiplication circuits 19 and 20; and shifting of the contents of the registers 11 and 43, with looping of the outputs of these registers to their inputs; multiplying of D(d−2) by Q(q−1−j) in the multiplication circuit 19; multiplying D(d−1) by Q(q−1−j) in the multiplication circuit 20; subtracting of M(m−j), M(m−j−1) from D(d−1)*Q(q−1−j) in the subtraction circuit 44; subtracting of M(m−2−j) from the data element produced by the subtraction circuit 44 in the subtraction circuit 45, the word M(m−2−j) having been delayed in the delay cell 47; subtracting of the data element produced by the subtraction circuit 45 from D(d−2)*Q(q−1−j) in the subtraction circuit 29; and testing of the result of the last subtraction in the test circuit.

Step E5 includes the steps of determining that if the result of the last subtraction of the step E4 is positive, then the contents of the register 40 are shifted, and register 40 has its input and its output connected by multiplexer 41; subtracting of an L bit data element given by the multiplexer 54 and formed by a least significant bit at one and by a L−1 most significant bit at zero, from the data element Q(q−1−j) initially present in the register 40, the subtraction being done in the subtraction circuit 46; and storing of the data element produced by the subtraction circuit 46 in the register 40; and repeating the preceding step E4.

Step E6 includes the steps of determining that if the result of the last subtraction of the step E4 is negative, then the words M(m−j) . . . M(m−d−j) are loaded into the register 11 and of the data element D into the register 12; shifting of the contents of the registers 11 and 12 with the looping of the output of the register 12 to its input so as to keep D(d−1) in this register; multiplying the data element D by the data element Q(q−1−j) in the multiplication circuit 20; subtracting the result produced by the multiplication circuit 20 from the bits given by the register 11 in the subtraction circuit 44; then the second input of the multiplexer 55 is selected so that the subtraction circuit 45 is transparent; and testing of the result, for example, in the test circuit 35.

Step E6 further includes the steps of determining that if the result given by the subtraction circuit 44 is negative, then the data element D given by the register 12 is added to the result produced by the subtraction circuit 44 in the addition circuit 56; and subtracting an L bit data element, given by the multiplexer 54 and formed by a least significant bit at 1 and by L−1 most significant bits at zero, from the data element Q(q−1−j) initially present in the register 40, the subtraction being done in the subtraction circuit 46; and storing the result in the register 40.

The storage of the last two words of the result produced by the subtraction circuit 44 or by the addition circuit 56, referenced M(m−1−j) . . . M(m−d−j), is placed in the registers 10 and 40; the data element Q(q−1−j) and the data elements M(m−3−j) . . . M(m−d−j) are output from the coprocessor for eventually storing; the data elements M(m−3−j) . . . M(m−d−j) replace the data elements M(m−3−j) . . . M(m−d−j) of corresponding place values in the data element M, the least significant bits of the words M(m−1−j) and M(m−2−j) are directed towards the outputs of the registers 10 and 40; and loading of L zeros into the register 11.

With regard to the step E2, it is possible to carry out the following procedure which is similar to the procedure described in the referenced patent application in considering the integer division of a 2*L bit data element by an L bit data element. The following procedure includes steps E21 to E27. Step E21 is the step of resetting of the test circuit 35 and of the subtraction circuits 28 and 29.

Step E22 includes the steps of shifting by one bit of the registers 11 and 12, the register 11 recovering the most significant bit of the register 10 as a most significant bit by the multiplexer 14, the register 12 having its output connected to its input by the multiplexer 15; subtracting in the subtraction circuit 29 between the most significant bit of the register 10 and the least significant bit of the register 12, the subtraction circuit 28 carrying out a subtraction between the least significant bit of the register 11 and zero.

Step E23 includes the steps of shifting by 2*L−1 bits of the registers 11 and 12, the output of the register 12 being connected to its input by the multiplexer 15, the input of the third register 11 being connected to the output of the subtraction circuit 28 by the multiplier 14; subtracting between the 2*L−1 bits output from the register 11 and zero in the subtraction circuit 28; subtracting between the result output from the subtraction circuit 28 and the bits of the register 12.

Step E24 includes the steps of storing of the last carry value of the third subtraction circuit in the test circuit and the production at the output of this test circuit of a binary data element equal to the complement of the stored carry value.

Step E25 includes the steps of shifting by one bit of the registers 40 and 10, the most significant bit of the register 10 being loaded as the least significant bit of the register 10, the binary data element stored in the test circuit 35 being loaded as a least significant bit in the register 40.

Step E26 includes the steps of resetting of the subtraction circuits 28 and 29.

Step E27 includes the steps of repeating 2*L−1 times the steps E2 to E6, the subtraction circuit 28 performing a subtraction between the contents of the register 11 and zero if the previously stored carry value is equal to one, or the subtraction circuit 28 carries out a subtraction between the contents of the register 11 and the contents of the register 12 if the previously stored carry value is equal to zero.

The gain in computation time is now further described. It will be assumed, for example, that there are M on 2*n bits in D on n bits with n=512 and that the data elements are subdivided into words of L=32 bits. We then have m=32 and d=16, and q=17. According to the prior art, the result is obtained in $2*n^2+9*n$ clock cycles, namely in 528,896 clock cycles. With the new method, the number of clock cycles needed may be approximated as follows, in assuming that the registers are loaded in parallel when possible. The redundant computation following the step E4 should not be performed. The few isolated clock cycles needed for the operations of the resetting of the different computation circuits are overlooked.

The step E1 requires L clock cycles. The step E2 requires $(m-d+1)*(2*L^2+6*L)$ clock cycles. The step E3 requires $(m-d+1)*(2*L+1)$ clock cycles. The step E4 requires $(m-d+1)*(2L)$ clock cycles. The step E6 requires $(m-d+1)*(2*(d+1)*L+L)$ clock cycles. This provides the following formula having an approximate total of $(m-d+1)*(2*L^2+13*L+2*d*L+1)+L$. In the example shown, the number of clock cycles necessary will therefore be approximately 59,345. That is, nine times smaller than with the prior art method.

It will be noted that the possible repetition of the step E4 following the step E5 overlooked above will not substantially increase the computation time. If it is assumed, for example, that it is necessary to routinely repeat the step E4, the number of additional clock cycles will be approximately 1,650 which is small as compared with the gain provided by the invention as compared with the method according to the prior art.

Furthermore, it will be noted that the method described can be modified to reduce the number of external exchanges needed with the coprocessor, by using variable sized registers as illustrated, for example, in FIGS. 5 and 6. Indeed, one characteristic which is generally sought in a coprocessor is the ability to carry out operations at an operating frequency far higher than that of the elements with which it is associated, e.g., processor, memory, etc. Naturally, if the coprocessor has to perform data exchanges with the elements with which it is associated, it must do so at a frequency compatible with the operating frequency of the elements, typically at a lower frequency. It is therefore useful to minimize the number of exchanges between the coprocessor and its environment. By using variable sized registers formed by sub-registers, a part of which may be used to store data elements that have to be used, it is possible to reduce the number of exchanges needed by modifying some of the steps of the method according to the invention as indicated above.

Step E1 is modified to include the steps of loading of the data element M and of L zeros into the register 11 the multiplexer 14; loading of the word M(m−1) into the register 40 by the multiplexer 41, the most significant bits of this word provided at an output of this register 40; loading of L zeros, corresponding to a word M(m), into the register 10 by the multiplexer 13; loading of the data element D into the register 12 by the multiplexer 15, the least significant bit of the word D(d−1) being at output of this register 12.

Step E3 has been modified to include the steps of transferring the contents of the registers 16 and 17 respectively into the registers 21 and 22; loading of the word D(d−2) into the register 10 by the multiplexer 13, the least significant bit of this word provided at an output of the register 10; loading of the word M(m−2−j) into the register 43, the least significant bit of this word being directed towards the output.

Step E6 has been modified to include the steps of determining that if the result of the last subtraction of the step E4 is negative, then the contents of the registers 11 and 12 are shifted; multiplying the data element D by the data element Q(q−1−j) in the multiplication circuit 20; subtracting the result produced by the multiplication circuit 20 from the bits given by the register 11 in the subtraction circuit 44; storing the last two words of the result produced by the subtraction circuit 44, referenced M(m−1−j) . . . M(m−d−j), in the registers 11, 10 and 40, then the second input of the multiplexer 55 is selected so that the subtraction circuit 45 is transparent; and storing the data elements M(m−3−j) . . . M(m−d−j) in the register 11 and replacing the data elements M(m−3−j) . . . M(m−d−j) having corresponding place values in the data element M, the least significant bits of the words M(m−1−j) and M(m−2−j) being oriented towards the outputs of the registers 10 and 40.

If the result produced by the subtraction circuit 44 is negative, then the data element D, given by the register 12, is added to the result produced by the subtraction circuit 44 in the addition circuit 56; and subtracting an L bit data element, given by the multiplexer 54 and formed by a least significant bit at 1 and L−1 most significant bits at zero, from the data element Q(q−1−j) initially present in the register 40, the subtraction being done in the subtraction circuit 46; and storing the result in the register 40; and loading of L zeros into the register 11.

Naturally, the necessary modifications will be made in the coprocessor. Thus, additional connections will be planned between the outputs of the registers 11 and 12 and the multiplexers enabling access to the registers 10, 40 and 43 to enable a transfer of data elements contained in the registers 11 and 12 to these other registers. To do this, it is possible to provide for dedicated connections and, accordingly, to use multiplexers having an additional input or else make use of the existing connections which come from the multiplexer 49 and/or the test circuit 35.

What is claimed is:

1. A method for performing at least one of encryption and decryption of binary encoded messages in a coprocessor including an integer division of a first data element M binary encoded on m words M(m−1) . . . M(1) M(0) of L bits by a second data element D binary encoded on d words D(d−1) . . . D(1) D(0) of L bits with m, L and d as integers and d<m, and a result Q being encoded on q words Q(q−1) Q(q−2) . . . Q(1) Q(0) of L bits with q=m−d+1 and Q(q−1)=00 . . . 00 or 00 . . . 01, the method comprising:

receiving the first data element M and the second data element D based upon the binary encoded messages;

Step a—loading of the word M(m−1) into a first register, a most significant bit of this word provided at an output of the first register; loading of L zeros corresponding to the word M(m) into a second register; loading of L zeros into a third register; loading of the word D(d−1) into a fourth register, a least significant bit of this word provided at an output of the fourth register; and repeating q times steps b–f, with j being an index varying from 0 to q–1:

Step b—performing an integer division on contents of the second and first registers by contents of the fourth register, and storing L least significant bits of a result corresponding to the first intermediate data element Q(q–1–j) in the first register and in the fifth and sixth registers;

Step c—loading of the word D(d–2) into the second register, a least significant bit of this word provided at an output of the second register; loading of the words M(m–1–j) and M(m–j) in series in the third register, least significant bits of these words being oriented towards an output of the third register; loading of the word M(m–2–j) into a seventh register, a least significant bit of the word being oriented towards an output of the seventh register;

Step d—shifting contents of the second and fourth registers towards series inputs of a first multiplication circuit and a second multiplication circuit and contents of the third and seventh registers, and making a loop of the outputs of these registers to their inputs; multiplying of D(d–2) by Q(q–1–j) in the first multiplication circuit; multiplying of D(d–1) by Q(q–1–j) in the second multiplication circuit; subtracting of M(m–j)M(m–j–1) from D(d–1)*Q(q–1–j) in a first subtraction circuit; subtracting of M(m–2–j) from a data element produced by the first subtraction circuit in a second subtraction circuit, the word M(m–2–j) having been delayed in a delay cell; subtracting of the data element produced by the second subtraction circuit from D(d–2)*Q(q–1–j) in a third subtraction circuit; a result of a last subtraction being the second intermediate data element Z(m–j) binary encoded on 2*L bits; and testing of the result of the last subtraction in a test circuit;

Step e—determining that if a result of the last subtraction of Step d is positive, wherein decrementing by one unit the first intermediate data includes shifting contents of the first register; subtracting of an L bit data element formed by a least significant bit at one and of L–1 most significant bits at zero from the first intermediate data element Q(q–1–j) initially present in the first register, the subtraction being done in a fourth subtraction circuit, and storing of a data element produced by the fourth subtraction circuit in the first register; and repeating Step d; and Step f—determining that if the result of the last subtraction of Step d is negative, then loading of the words M(m–j) . . . M(m–d–j) into the third register and of the second data element D into the fourth register; shifting of the contents of the third and fourth registers, and making a loop of the output of the fourth register to its input to keep D(d–1) in this register; multiplying the second data element D by the data element Q(q–1–j) in the second multiplication circuit to produce the third intermediate data element B; subtracting of a result produced by the second multiplication circuit from bits of the first data M provided by the third register in the first subtraction circuit, and testing of a result;

if the result given by the first subtraction circuit is negative, then the second data element D given by the fourth register is added to the result produced by the first subtraction circuit in an addition circuit, and subtracting of an L bit data element formed by one least significant bit at one and by L–1 most significant bits at zero from the data element Q(q–1–j) initially present in the first register, the subtraction being done in the fourth subtraction circuit, and storing of the data element produced by the fourth subtraction circuit in the first register; storing of the last two words of the result produced by the first subtraction circuit or by addition circuit, referenced M(m–1–j) . . . M(m–d–j), in the second and first registers, the data elements Q(q–1–j) and M(m–3–j) . . . M(m–d–j) being output outside the coprocessor and data elements M(m–3–j) . . . M(m–d–j) replacing data elements M(m–3–j) . . . M(m–d–j) having corresponding place values in the first data element M, least significant bits of the words M(m–1–j) and M(m–2–j) being oriented towards the outputs of the second and fifth registers; and loading of L zeros into the third register; and outputting a result of the integer division of the first data element M by the second data element D based upon the binary encoded messages.

2. A method according to claim 1, wherein the Step b further comprises:

Step b1—resetting the test circuit, the third subtraction circuit and a fifth subtraction circuit;

Step b2—shifting by one bit of the third and fourth registers, the third register recovering a most significant bit of the second register as a most significant bit, the fourth register having its output connected to its input; subtracting in the third subtraction circuit between the most significant bit of the second register and a least significant bit of the fourth register, the fifth subtraction circuit carrying out a subtraction between a least significant bit of the third register and zero;

Step b3—shifting by 2*L–1 bits of the third and fourth registers, the output of the fourth register being connected to the output of the fifth subtraction circuit; subtracting between the 2*L–1 bits output from the third register and zero in the fifth subtraction circuit; subtracting between a result output from the fifth subtraction circuit and the bits of the fourth register;

Step b4—storing of a last carry value of the third subtraction circuit in the test circuit and producing at the output of the test circuit of a binary data element equal to a complement of the stored carry value;

Step b5—shifting by one bit of the first and second registers, a most significant bit of the first register being loaded as a least significant bit of the second register, a binary data element stored in the test circuit being loaded as a least significant bit in the first register;

Step b6—resetting of the third and fifth subtraction circuits; and

Step b7—repeating 2*L–1 times of the Steps b–f, the fifth subtraction circuit performing a subtraction between the contents of the third register and zero if the previously stored carry value is equal to one or the fifth subtraction circuit performing a subtraction between the contents of the third register and contents of the fourth register if the previously stored carry value is equal to zero.

3. A method for performing at least one of encryption and decryption of binary encoded messages in a coprocessor including an integer division of a first data element M binary encoded on m words M(m–1) . . . M(1) M(0) of L bits by a second data element D binary encoded on d words D(d–1) . . . D(1) D(0) of L bits with m, L and d as integers and d<m, and a result Q being encoded on q words Q(q–1) Q(q–2) . . . Q(1) Q(0) of L bits with q=m–d+1 and Q(q–1)=00 . . . 00 or 00 . . . 01, the method comprising:

receiving the first data element M and the second data element D based upon the binary encoded messages;

Step a—loading of the first data element M and of L zeros in a third register; loading of the word M(m−1) in a first register, a most significant bit of this word provided at an output of the first register; loading of L zeros corresponding to the word M(m) in a second register; loading of the second data element D in a fourth register, a least significant bit of a word D(D−1) provided at an output of the fourth register, and repeating q times steps b–f, with j being an index varying from 0 to q−1;

Step b—performing an integer division on contents of the second and first registers by contents of the fourth register, and storing L least significant bits of a result corresponding to the first intermediate data element Q)q−1−j) in the first register and in the fifth and sixth registers;

Step c—loading of the word D(d−2) into the second register, a least significant bit of this word being at an output of the second register; loading of the word M(m−2−j) into a seventh register, a least significant bit of this word being oriented towards the output of this register;

Step d—shifting contents of the second and fourth registers towards series inputs of a first multiplication circuit and a second multiplication circuit and contents of the third and seventh registers, and making a loop of the outputs of these registers to their inputs; multiplying of D(d−2) by Q(q−1−j) in the first multiplication circuit; multiplying of D(d−1) by Q(q−1−j) in the second multiplication circuit; subtracting of M(m−j)M(m−j−1) from D(d−1)*Q(q−1−j) in a first subtraction circuit; subtracting of M(m−2−j) from a data element produced by the first subtraction circuit in a second subtraction circuit, the word M(m−2−j) having been delayed in a delay cell; subtracting the data element produced by the second subtraction circuit from D(d−2)*Q(q−1−j) in a third subtraction circuit; the result of a last subtraction being the second intermediate data element Z(m−j) binary encoded on 2*L bits; and testing of the result of the last subtraction in a test circuit;

Step e—determining that if a result of the last subtraction of Step d is positive, wherein decrementing by one unit the first intermediate data includes shifting contents of the first register; subtracting of an L bit data element formed by a least significant bit at one and of L−1 most significant bits at zero from the first intermediate data element Q(q−1−j) initially present in the first register, the subtraction being done in a fourth subtraction circuit, and storing of a data element produced by the fourth subtraction circuit in the first register; and repeating Step d; and Step f—determining that if the result of the last subtraction of Step d is negative, then contents of the third and fourth registers are shifted; multiplying the second data element D by the data element Q(q—1−j) in a second multiplication circuit to produce the third intermediate data element B; subtracting a result produced by the second multiplication circuit from bits of the first data M provided by the third register into the first subtraction register;

if a result produced by the first subtraction circuit is negative, then the second data element D given by the fourth register is added to a result produced by the first subtraction circuit in the addition circuit, and subtracting a data element of L bits formed by one least significant bit at one and by L−1 most significant bits at zero from the data element Q(q−1−j) initially present in the first register, the subtraction being done in the fourth subtraction register, and storing a result of a last subtraction in the first register; storing of a last two words of a result produced by the first subtraction circuit or by addition circuit, referenced M(m−1−j) . . . M(m−d−j), in the third, second and first registers, the data elements M(m−3−j) . . . M(m−d−j) being stored in the third register and replacing the data elements M(m−3−j) . . . M(m−d−j) having corresponding place values in the first data element M, least significant bits of the words M(m−1−j) and M(m−2−j) being directed towards outputs of the second and first registers; and loading of L zeros into the third register; and outputting a result of the integer division of the first data element M by the second data element D based upon the binary encoded messages.

* * * * *